United States Patent [19]

Fertig et al.

[11] Patent Number: 4,768,863

[45] Date of Patent: Sep. 6, 1988

[54] LIQUID CRYSTAL CELL HAVING MIM ELEMENTS ON BOTH SUBSTRATES

[75] Inventors: Werner Fertig, Darmstadt; Dieter Schurig, Wallrabenstein, both of Fed. Rep. of Germany

[73] Assignee: VDO Adolf Schindling AG, Frankfurt am Main, Fed. Rep. of Germany

[21] Appl. No.: 882,542

[22] Filed: Jul. 7, 1986

[30] Foreign Application Priority Data

Jul. 5, 1985 [DE] Fed. Rep. of Germany ....... 3524085

[51] Int. Cl.⁴ .......................... G02F 1/13; G02F 1/133
[52] U.S. Cl. ................................ 350/339 R; 350/334; 350/336; 350/332; 350/392
[58] Field of Search .................... 350/334, 336, 339 R, 350/392, 332

[56] References Cited

U.S. PATENT DOCUMENTS

| | | | |
|---|---|---|---|
| 3,840,695 | 10/1974 | Fischer | 350/392 |
| 3,939,556 | 2/1976 | Borel et al. | 350/343 |
| 4,249,800 | 2/1981 | Spruijt | 350/344 |
| 4,572,615 | 2/1986 | Nickol et al. | 350/334 |
| 4,666,252 | 5/1987 | Yaniv et al. | 350/339 R |

FOREIGN PATENT DOCUMENTS

| | | | |
|---|---|---|---|
| 2805970 | 1/1980 | Fed. Rep. of Germany . | |
| 2849402 | 5/1980 | Fed. Rep. of Germany . | |
| 0046717 | 4/1980 | Japan | 350/334 |
| 0009635 | 1/1984 | Japan | 350/334 |
| 0045219 | 3/1985 | Japan | 350/334 |
| 0009624 | 1/1986 | Japan | 350/332 |
| 1425263 | 2/1976 | United Kingdom | 350/336 |

Primary Examiner—Stanley D. Miller
Assistant Examiner—Huy Mai
Attorney, Agent, or Firm—Martin A. Farber

[57] ABSTRACT

In a liquid crystal cell having two substrates which are spaced apart from each other and form between themselves a cell space filled with liquid crystal substance, the lines and electrodes which are applied on both substrates are applied as superimposed layers insulated from each other, the lines being transparent. In this way, substantially better utilization of the surface of the liquid crystal cell is obtained than in the case of the known liquid cells in which lines and electrodes are arranged alongside of each other.

14 Claims, 3 Drawing Sheets

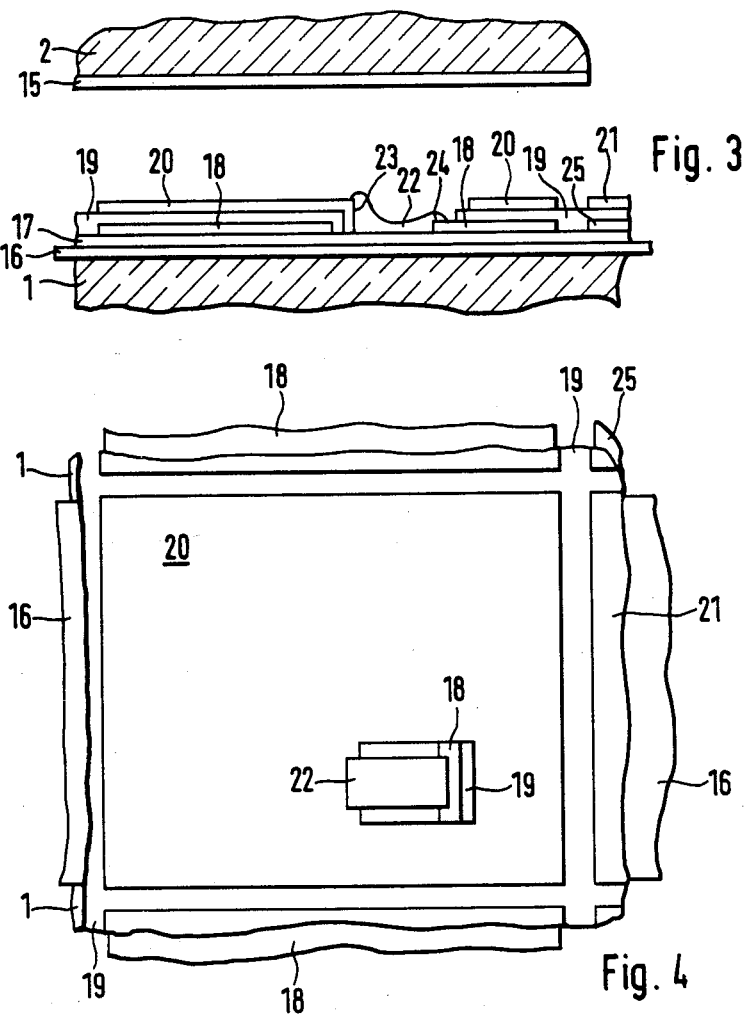

LIQUID CRYSTAL CELL HAVING MIM ELEMENTS ON BOTH SUBSTRATES

FIELD AND BACKGROUND OF THE INVENTION

The invention relates to a liquid crystal cell having two substrates spaced apart from each other which form between each other a cell space filled with liquid crystal substance. Lines, electrodes and other elements are applied on at least one substrate on the side facing the cell space.

In such liquid crystal cells the individual picture electrodes are controlled by a multiplex process. For this purpose, intersecting lines are necessary which are acted on by pulses in such a manner that the picture elements associated with the individual points of intersection are acted on one after the other. Each pair of electrodes of a picture element which form a capacitor is charged or not charged according to the information to be represented. In order for the charge of the picture element to be retained until the next response time, at least one of the electrodes associated with the picture element is connected with the corresponding line via a switch element.

In known liquid crystal cells, field-effect transistors or metal-insulator-metal elements (MIM elements) are used as switch elements. The known liquid crystal cells, however, have the disadvantage that a large part of the available surface is used up by the conductive paths. Thus in one known liquid crystal cell only 64% of the total surface is available for picture elements. The clarity of the symbols to be represented by means of the liquid crystal cells suffers from this. Since, furthermore, the conductive paths cannot be made as narrow as might be desired, limits are placed on the resolution of the picture, particularly in the known liquid crystal cells of small dimensions.

SUMMARY OF THE INVENTION

It is an object of the present invention to provide a liquid crystal cell which avoids the disadvantages of the known liquid crystal cells.

According to the invention, the lines (e.g. 3, 4, 16, 18, 26, 28) and the electrodes (10, 20) are applied as superimposed layers, insulated from each other.

By this development it is possible to utilize a substantially larger portion of the surface for the picture elements than in the known liquid crystal cells.

Further according to a feature of the invention, the lines (3, 4, 16, 18, 26, 28) are transparent.

Still further, the lines (3, 4, 16, 18, 26, 28) and/or electrodes (10, 20) can be made of indium-tin oxide.

Also, according to a feature of the invention, the lines (3, 4, 16, 18) substantially overlap the surfaces of the picture electrodes (10, 20) associated with them.

Still further, the lines (26, 28) take up a smaller area than the electrodes (20).

In a further development of the invention, a conductive shielding layer (8) and another insulating layer (9) are arranged between the electrodes (10) and the lines (3). In this way, disturbances by the pulse-like control signals on the lines are excluded.

In a second embodiment, in which metal-insulator-metal elements (MIM elements) (5) are provided for connecting the lines (3) to the electrodes (10), adjacent lines (3, 4) are applied on both substrates, an insulating layer (6) is applied thereover and, on top thereof, electrodes (10). Furthermore, in this further embodiment of the invention, the MIM elements (5) are arranged in recesses in the electrodes (10) and lines (3), the lined (3) on the one substrate (1) extending perpendicular to the lines on the other substrate (2).

Yet further according to the invention, the electrodes (10), the lines (3) and the insulating layer (6) overlap in such a manner that in each case one electrode (10) is in conductive contact with the one connection (11) of an MIM element (5) and the corresponding line (3) is in conductive connection with the other connection (12) of the MIM element.

In a third development of the invention, the lines (16, 18) are connected to the electrodes (20) by means of transistors (22), two intersecting groups of parallel lines (16, 18) and electrodes (20) being provided one above the other on one substrate (1). In each case the first group of lines (16) is separated from the second group of lines (18) and from the electrodes (20) by insulating layers (17, 19), and a common electrode (15) is provided on the other substrate (2).

The transistors 22 can be field-effect transistors developed in particular as thin-film transistors.

Still further, with the third-mentioned further development the transistors (22) are arranged in recesses in the electrodes (20) and the lines (18) of the second group.

Yet further, with the third-mentioned development, the electrodes (20), the lines (16, 18) and the insulating layers (17, 19) overlap in such a manner that in each case one electrode (20) is connected with a first connection (23) of a transistor and the corresponding lines (18) of the second group is connected with a second connection (24) of the transistor (22) and that in each case one line (16) of the first group forms a third connection of the transistors (22).

Also with the third-mentioned embodiment, the lines (26, 28) cover a smaller area than the electrodes (20) and the lines of the second group are arranged in sections in the same plane as the lines of the first group.

In addition to this, the lines (26,28) have in each case for each electrode a narrow region (27) and a region of a width which increases in the longitudinal direction of the lines.

Finally, there is provided generally in a special embodiment of the third-mentioned further development, a smaller area for the lines (26, 28) than for the picture elements, so that each of the picture elements is only partially covered by two lines. In this way, the loss of contrast, which in itself is already only slight, is further reduced by the transparent lines.

BRIEF DESCRIPTION OF THE DRAWINGS

With the above and other objects and advantages in view, the present invention will become more clearly understood in connection with the detailed description of preferred embodiments, when considered with the accompanying drawings, of which:

FIG. 3 is a partial cross section through a liquid crystal cell having a field-effect transistor for connecting an electrode to a line;

FIG. 4 is a partial plan view of the structure on a substrate of the liquid crystal cell of FIG. 3.

DETAILED DESCRIPTION OF THE PREFERRED EMBODIMENTS

In the figures, the same parts have been provided with the same reference numbers.

Figure 1:
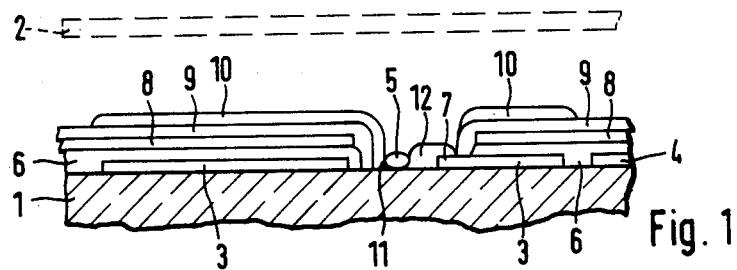
FIG. 1 is a partial cross section through a liquid crystal cell having an MIM element for the connecting of an electrode to a conductor.

The liquid crystal cell a part of which is shown in FIG. 1 has a first substrate 1 and a second substrate 2. The second substrate 2 has layers similar to those of the substrate 1 and has therefore merely been schematically indicated. However, it is turned 90° with respect to substrate 1 in the plane of the substrate. Depending on the number of rows of picture elements desired, a corresponding number of lines are applied to the substrate 1, only the line 3 and a part of an adjacent line 4 being shown in FIG. 1. Both the line 3 and the layers arranged above it are interrupted in the region of an MIM element 5.

After the line 3 has been applied upon the manufacture of the liquid crystal cell, an insulating layer 6 is placed over it, it surrounding the line 3. Only a portion of the line remains free at 7 in order to be able to connect the MIM element 5. A shielding layer 8 is applied over the insulating layer 6 and an insulating layer 9 is then applied on top thereof.

The MIM element 5 used in the embodiment according to FIG. 1 consists of a tantalum layer whose surface is anodized. Upon the application of a picture electrode 10, which contacts the anodized surface of the tantalum layer at 11, a conductive connection 12 is created between the conductor 3 and another surface of the tantalum layer 5. In this way a double MIM element is produced which serves, in known manner, for the transmitting of the charge from the data line to the picture electrode 10.

In one embodiment of the invention, indium-tin oxide has proven advantageous for the lines, the shielding layers and the picture electrodes.

Figure 2:
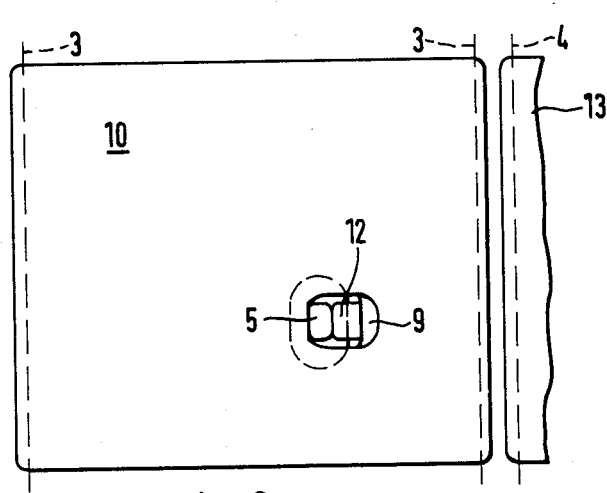
FIG. 2 is a partial plan view of the structure on a substrate of the liquid crystal cell according to FIG. 1.

The partial plan view shown in FIG. 2 of the structure present on the substrate 1 of the liquid crystal cell of FIG. 1 shows the picture electrode 10 as well as parts of the adjacent picture electrode 13, the MIM element 5, the conductive connection 12 and—in dashed line—the data lines 3 and 4 as well as parts of the insulating layer 9.

In the liquid crystal cell shown in part in FIG. 3, a field-effect transistor developed as thin-film transistor is used as switchable connection between the picture elements and the lines. In the case of the liquid crystal cell of FIG. 3, the entire coordinate control is applied on the substrate 1, while merely a continuous common counterelectrode 15 is applied to the substrate 2.

On the substrate 1 there is present, first of all, a transparent conductive layer 16 which forms a line extending parallel to the plane of the drawing. Over this there is applied an insulating layer 17 which completely covers the line 16 and the lines extending parallel thereto (not shown in the drawing), contacting possibilities for the lines being provided, however, at the edge of the liquid crystal cell. A second group of lines which extends perpendicular to the plane of the drawing is applied on the insulating layer 17. Only the line 18 and part of one other line 25 of the second group of lines are shown. Over these lines there is again applied an insulating layer 19, which then bears the picture electrodes 20 and 21.

The line 18 and the picture electrode 20 are provided with recesses for a semiconductor element 22. The semiconductor element 22 is contacted at 23 by the picture electrode 20 and at 24 by the line 18. Together with a part of the line 16 it forms a field-effect transistor.

FIG. 4 is a plan view of the liquid crystal cell of FIG. 3 with the substrate 2 removed. The partial showing shows, among other things, the course of the lines 16, 18 and 25. The line 16, which extends in the row direction, forms simultaneously all gate electrodes of the field-effect transistors of one row. The line 18, in addition to being connected to the semiconductor element 22 of the picture element shown, is also connected to semiconductor elements of the other picture elements in the same column. By suitable control of the lines only one field-effect transistor is brought at any one time into the conductive state and charge thus transferred to the picture electrode. During the actuating of the other picture elements the charge on the picture electrode is retained and thus brings the liquid-crystal substance into the state desired for the display of the symbol.

In accordance with a further development of the invention, parts of the structure applied to a substrate can be provided with an insulating layer which serves as spacer. This layer is preferably applied to parts of the structure which are in any event opaque such as, for instance, the semiconductor element 22.

Figure 5:
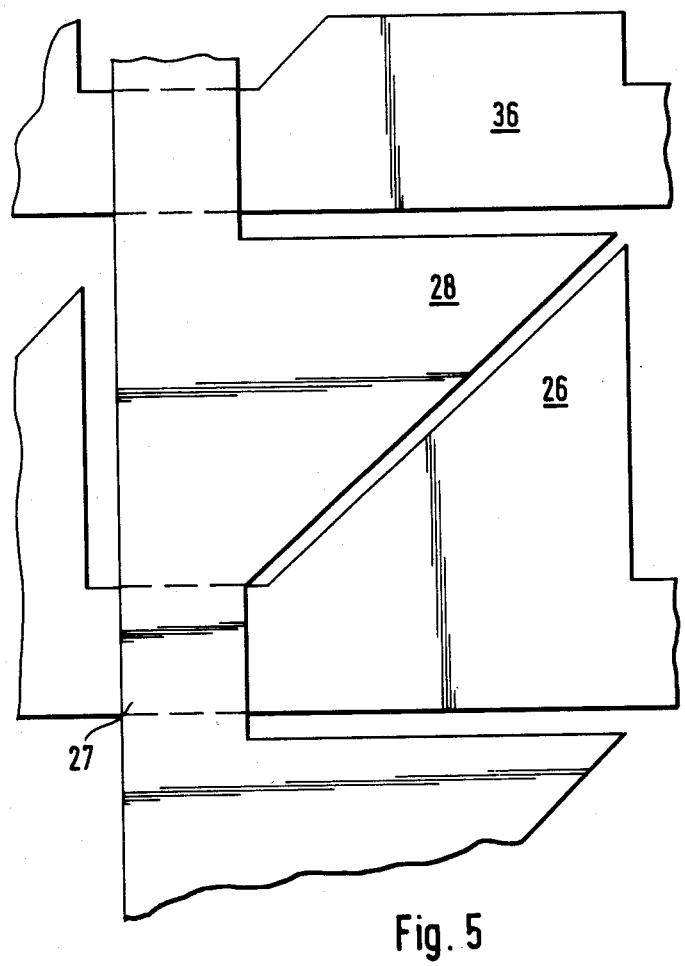
FIG. 5 is a diagram of lines in a variant of the liquid crystal cell according to FIGS. 3 and 4.

The line 16 and layers 17, 19 are made of a material which is transparent in the slight layer thicknesses involved, for instance indium-tin oxide. In the case of the liquid crystal cell of FIGS. 3 and 4, the lines 16 and 18 are arranged in the optical path, in addition to the picture electrode 20 which is also transparent. An arrangement in which only one additional electrically conductive layer aside from the picture electrode is present in the optical path is shown in FIG. 5. FIG. 5 shows only lines, the other elements corresponding essentially to the elements shown in FIGS. 3 and 4. The lines 26 and 28 are so shaped that they lie above one another only within a small region of intersection 27 while in the optically active region of a picture element they are not superposed. The switch element, and possibly a spacer, can also preferably be arranged in the region 27. Another line 36 which extends parallel to the line 26 is shown in part.

By the shape of the lines shown in FIG. 5 the result is obtained that the average cross section of the lines is relatively large despite a great reduction in the overlap surface 27, so that the resistance of the lines satisfies the requirements for the pulse control.

We claim:

1. In a liquid crystal cell having two substrates spaced apart from each other, said substrates form between each other a cell space filled with liquid crystal substance, and wherein lines, electrodes and other elements are applied on both of the substrates on a side facing the cell space, said lines for conducting electric signals, and said electrodes for presenting picture elements are disposed as superimposed layers, insulated from each other upon said substrates, and wherein said cell further comprises metal-insulator-metal elements (MIM elements) which interconnect individual ones of said lines to individual ones of said electrodes; and wherein individual ones of said lines are applied side by side on one of said substrates, other ones of said lines being applied side by side on the second of said substrates, there being insulating layers disposed between said lines and said electrodes on each of both substrates;

said MIM elements are disposed in recesses of said electrodes and said lines; and said lines applied on one of said substrates are disposed perpendicularly to said lines applied on the other one of said substrates.

2. In a liquid crystal cell according to claim 1, wherein individual ones of said lines are transparent.

3. In a liquid crystal cell according to claim 2, wherein said lines and/or said electrodes are made of indium-tin oxide.

4. In a liquid crystal cell according to claim 1, wherein a plurality of said lines substantially overlap surfaces of individual ones of said picture electrodes associated with said plurality of lines.

5. In a liquid crystal cell according to claim 1, wherein a plurality of said lines occupy a smaller area than individual ones of said electrodes associated therewith.

6. In a liquid crystal cell according to claim 1, further comprising a conductive shielding layer and a further insulating layer which are arranged between individual ones of said electrodes and individual ones of said lines.

7. In a liquid crystal cell according to claim 1, wherein said electrodes and said lines and said insulating layer overlap leaving one of said electrodes in conductive contact with one terminal of one of said MIM elements, a second terminal of said one MIM element being in conductive contact with one of said lines.

8. In a liquid crystal cell having two substrates spaced apart from each other, said substrates form between each other a cell space filled with liquid crystal substance, and wherein lines, electrodes and other elements are applied on at least one of the substrates on a side facing the cell space, said lines for conducting electric signals, and said electrodes for presenting picture elements are disposed as superimposed layers, insulated from each other upon said at least one substrate, the cell further comprising transistors disposed on said at least one substrate, insulating layers, and a common electrode disposed on the second of said substrates; and wherein individual ones of said lines are connected to individual ones of said electrodes by means of said transistors, there being two intersecting groups of parallel ones of said lines and said electrodes located one above the other on said at least one substrate;

a first group of said lines is separated from a second group of said lines and from the electrodes by said insulating layers, said common electrode being located opposite said electrodes; and wherein said transistors are placed in recesses in individual ones of said electrodes and in individual ones of said lines of the second group.

9. In a liquid crystal cell according to claim 8, wherein said transistors are field-effect transistors developed as thin-film transistors.

10. In a liquid crystal cell according to claim 8, wherein the electrodes, the lines and the insulating layers overlap leaving one of said electrodes connected with a first terminal of a transistor and a corresponding line of said second group is connected with a second terminal of said transistor, there being one of said lines of the first group interconnecting a third terminal of the transistors.

11. In a liquid crystal cell according to claim 8, wherein individual ones of said lines occupy a smaller area than one of said electrodes, and lines of the second group are arranged in sections in a common plane with lines of the first group.

12. In a liquid crystal cell according to claim 11, wherein individual ones of said lines are characterized by a narrow region and a region of a width which increases in a longitudinal direction of the lines, these line regions being in registration with one of said electrodes.

13. In a liquid crystal cell according to claim 12, wherein said lines are provided with a smaller area than for the picture elements, so that each of the picture elements is only partially covered by two of said lines.

14. In a liquid crystal cell having two substrates spaced apart from each other, said substrates form between each other a cell space filled with liquid crystal substance, and wherein lines, electrodes and other elements are applied on a substrate on a side facing the cell space, said lines for conducting electric signals, and said electrodes for presenting picture elements are disposed as superimposed layers, insulated from each other upon one of said substrates, and wherein the cell further comprises metal-insulator-metal elements (MIM elements) which interconnect individual ones of said lines to individual ones of said electrodes; and wherein individual ones of said lines are applied side by side on said one substrate, there being insulating layers disposed between said lines and said electrodes on said one substrate; and wherein said MIM elements are disposed in recesses of said electrodes and said lines; and wherein said lines disposed in two groups, the lines of a first of the groups being disposed perpendicularly to the lines of the second group.

* * * * *